(12) United States Patent
Velarde et al.

(10) Patent No.: US 8,773,577 B2
(45) Date of Patent: Jul. 8, 2014

(54) REGION OF INTEREST EXTRACTION

(75) Inventors: Ruben M. Velarde, Chula Vista, CA (US); Thomas W. Osborne, San Diego, CA (US); Szepo Robert Hung, Carlsbad, CA (US); Haiyin Wang, San Diego, CA (US); Liang Liang, San Diego, CA (US); Ying X Noyes, San Diego, CA (US); Edward G. Atrero, San Marcos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 337 days.

(21) Appl. No.: 12/912,863

(22) Filed: Oct. 27, 2010

(65) Prior Publication Data

US 2012/0105668 A1 May 3, 2012

(51) Int. Cl.
 *H04N 5/222* (2006.01)
 *H04N 5/238* (2006.01)
(52) U.S. Cl.
 USPC .......................................... 348/370; 348/364
(58) Field of Classification Search
 USPC .......................... 348/362, 364, 366, 370, 371
 See application file for complete search history.

(56) References Cited

U.S. PATENT DOCUMENTS

| 5,442,408 | A | 8/1995 | Haruki et al. |
| 6,970,199 | B2 | 11/2005 | Venturino et al. |
| 7,925,152 | B2 * | 4/2011 | Lien et al. ..................... 396/213 |
| 2002/0150306 | A1 | 10/2002 | Baron |
| 2004/0242184 | A1 | 12/2004 | Ito |
| 2005/0157204 | A1 * | 7/2005 | Marks ........................... 348/370 |
| 2007/0047945 | A1 | 3/2007 | Nose et al. |
| 2007/0248342 | A1 | 10/2007 | Tamminen et al. |
| 2008/0226147 | A1 | 9/2008 | Hargrove et al. |
| 2009/0160944 | A1 | 6/2009 | Trevelyan et al. |
| 2009/0251563 | A1 * | 10/2009 | Mochida et al. ........... 348/229.1 |

(Continued)

FOREIGN PATENT DOCUMENTS

| JP | 2000308068 A | 11/2000 |
| JP | 2002044516 A | 2/2002 |

(Continued)

OTHER PUBLICATIONS

Georg Petschnigg et al., Microsoft Corporation, "Digital Photography with Flash and No-Flash Image Pairs," ACM Transactions on Graphics (TOG), 2004, portal.acm.org, http://research.microsoft.com/en-us/um/people/hoppe/flash.pdf, pp. 1-9.

(Continued)

*Primary Examiner* — Kelly L Jerabek
(74) *Attorney, Agent, or Firm* — James R. Gambale, Jr.

(57) ABSTRACT

An example image capture device determines a region of interest using a first image captured while a light source is powered off and a second image captured while a light source is powered on and uses the region of interest to automatically set configurations. In one example, an image capture device includes a controlled light source, an image sensor configured to capture images, and a processing unit configured to cause the image sensor to capture a first image of a scene while the controlled light source is powered off, cause the image sensor to capture a second image of the scene while the controlled light source is powered on, calculate luminance differences between a plurality of regions in the first image and a plurality of collocated regions in the second image, and determine that a region of interest includes those regions for which the luminance differences exceed a threshold.

43 Claims, 7 Drawing Sheets

(56) References Cited

U.S. PATENT DOCUMENTS

| | | | |
|---|---|---|---|
| 2009/0303342 A1* | 12/2009 | Corcoran et al. | 348/222.1 |
| 2010/0149371 A1* | 6/2010 | Steinberg et al. | 348/222.1 |
| 2010/0245609 A1* | 9/2010 | Estevez | 348/222.1 |

FOREIGN PATENT DOCUMENTS

| | | |
|---|---|---|
| JP | 2009094997 A | 4/2009 |
| JP | 2009206651 A | 9/2009 |
| JP | 2010193002 A | 9/2010 |
| JP | 2010219606 A | 9/2010 |

OTHER PUBLICATIONS

International Search Report and Written Opinion—PCT/US2011/057746—ISA/EPO—Jan. 23, 2012.

Written Opinion of the International Preliminary Examining Authority—PCT/US2011/057746—ISA/EPO—Sep. 25, 2012.

* cited by examiner

REGION OF INTEREST EXTRACTION

TECHNICAL FIELD

This disclosure relates to image capture devices and, more particularly, to techniques for calibration of image capture devices.

BACKGROUND

Image capture devices, such as digital video cameras or digital still cameras, are used in different applications and environments. An image capture device should be capable of producing high quality imagery under a variety of lighting conditions. For example, image capture devices should be capable of operating effectively in environments that include large amounts of reflected or saturated light, as well as in environments that include high levels of contrast. A typical image capture device performs automatic exposure to select an exposure value (EV) that achieves a certain target brightness for a scene. For example, an image capture device may select an EV that produces an image frame of the scene with an average brightness value equivalent to approximately 18% gray.

An automatic exposure process may adjust aperture size, shutter speed, and sensor gain of the image capture device to correspond to the selected EV. In this way, the automatic exposure process controls an amount of light that reaches a sensor array within the image capture device to produce an image frame of a scene at the target brightness. However, some scenes may require a higher average brightness value while other scenes may require a lower average brightness value. For example, a snow scene includes a large amount of reflected light, for which the automatic exposure process may overcompensate, causing the image frame to look unnaturally dark. On the other hand, a scene containing a white document next to a black laptop includes a high contrast level, for which the automatic exposure process may also overcompensate, causing the white document to appear highly saturated in the image frame.

Exposure compensation is common in digital still cameras, but may also be utilized in digital video cameras and other types of image capture devices. Some cameras may be configured to perform auto exposure relative to a pre-selected area or scene section to determine the proper exposure. However, such an approach may not identify the proper region of interest. Accordingly, in some cases, conventional auto exposure may encounter errors, for example, where the wrong region of interest is identified or when the scene is backlit. A backlit object may cause some auto-exposure processes to improperly set exposure for the object.

SUMMARY

In general, this disclosure describes techniques for extracting a region of interest for digital imaging. In one example, a camera captures a first image without using a flash, a second image while using the flash, and then compares the first image and the second image to determine a region of interest. Alternatively, the first and second images may be captured while using the flash, but at different power levels. The flash illuminates objects relatively close to the camera, without illuminating objects far from the camera. Typically, a region of interest includes objects that are relatively close to the camera. Therefore, the comparison may identify objects that are more illuminated in the second image than in the first image as belonging within the region of interest.

In one example, a method includes capturing, with an image capture device, a first image of a scene while a controlled light source is at a first power level, capturing, with the image capture device, a second image of the scene while the controlled light source is at a second power level that is higher than the first power level, calculating luminance differences between a plurality of regions in the first image and a plurality of collocated regions in the second image, and determining that a region of interest includes those regions for which the luminance differences exceed a threshold.

In another example, an apparatus includes a controlled light source, an image sensor configured to capture images, and a processing unit configured to capture a first image of a scene while the controlled light source is at a first power level, capture a second image of the scene while the controlled light source is at a second power level that is higher than the first power level, calculate luminance differences between a plurality of regions in the first image and a plurality of collocated regions in the second image, and determine that a region of interest includes those regions for which the luminance differences exceed a threshold.

In another example, an apparatus includes means for providing controllable illumination, means for capturing a first image of a scene while the means for providing controllable illumination is at a first power level, means for capturing a second image of the scene while the means for providing controllable illumination is at a second power level that is higher than the first power level, means for calculating luminance differences between a plurality of regions in the first image and a plurality of collocated regions in the second image, and means for determining that a region of interest includes those regions for which the luminance differences exceed a threshold.

In another example, a computer-readable medium, such as a computer-readable storage medium, contains, e.g., is encoded with, instructions that cause a programmable processor to cause an image sensor to capture a first image of a scene while a controlled light source is at a first power level, cause an image sensor to capture a second image of the scene while the controlled light source is at a second power level that is higher than the first power level, calculate luminance differences between a plurality of regions in the first image and a plurality of collocated regions in the second image, and determine that a region of interest includes those regions for which the luminance differences exceed a threshold.

The details of one or more examples are set forth in the accompanying drawings and the description below. Other features, objects, and advantages will be apparent from the description and drawings, and from the claims.

DETAILED DESCRIPTION

This disclosure generally describes techniques for automatically determining a region of interest of a scene in an image captured by a camera. The camera may be configured to use the determined region of interest in a variety of ways. For example, the camera may be configured to perform auto-exposure, auto-white balance, auto-focus, or other automatic configuration of settings based upon the determined region of interest.

The techniques of this disclosure recognize that a camera flash typically illuminates foreground objects of an image, without illuminating the background of the image. These techniques also recognize that the closest object is normally a good estimate of the main region of interest in a scene. Therefore, the techniques of this disclosure may include capturing a first image of a scene while a controlled light source is at a first power level, e.g., powered off (at zero power) and capturing a second image of the scene while the controlled light source is at a second power level higher than the first power level, e.g., powered on at up to full power. After capturing the two images, the techniques may further include calculating luminance differences between a plurality of regions in the first image and a plurality of collocated regions in the second image and determining that a region of interest includes those regions for which the luminance differences exceed a threshold. In this manner, these techniques detect the most likely region of interest by using a power-controlled light source, e.g., a camera flash, and camera spatial reflectance difference information to automatically configure the camera settings.

The controlled light source may generally illuminate objects in the foreground more than the background. Likewise, the foreground objects are typically desirable to be included in a region of interest. Therefore, the process described above may result in an identification of regions that are more illuminated in the second image than in the first image, which may generally correspond to regions including foreground objects of the image. The identified regions may be used to automatically configure settings of an image capture device, such as a digital camera, a camera included in a mobile communication device such as a cellular phone, a still image capture mode for a video camera, or other image capture device. In general, automatic configuration settings, such as auto-exposure, auto-white balance, and auto-focus, may be performed based on a region of interest, such as the region of interest determined using the process described above.

Figure 1:
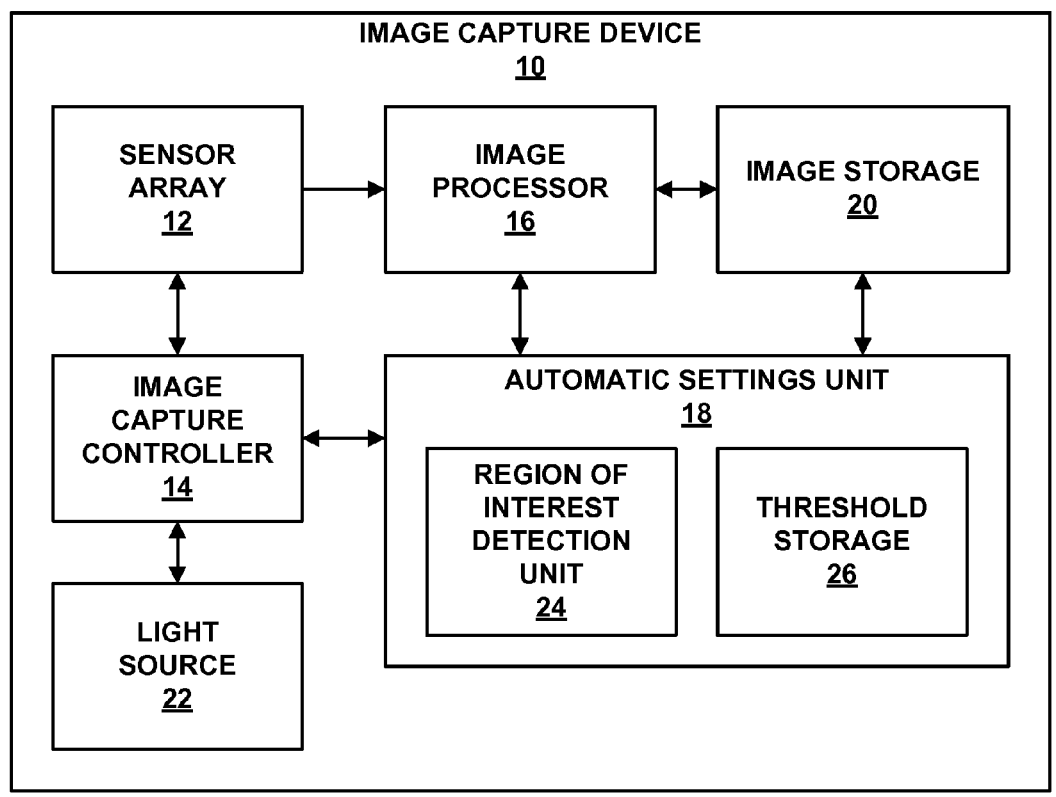
FIG. 1 is a block diagram illustrating an example image capture device configured to automatically detect a region of interest in a scene.

FIG. 1 is a block diagram illustrating an example image capture device 10 configured to automatically detect a region of interest. In the example of FIG. 1, image capture device 10 includes sensor array 12, image capture controller 14, image processor 16, automatic settings unit 18, image storage 20, and light source 22. Automatic settings unit 18 further includes region of interest detection unit 24 and threshold storage 26. The components included in image capture device 10 illustrated in FIG. 1 may be realized by any suitable combination of hardware and/or software. In the illustrated example, the components are depicted as separate units. However, in other examples, any of the components may be integrated into combined units within common hardware and/or software.

Image capture device 10 may be a digital camera, such as a digital video camera, a digital still camera, or a combination of both. In addition, image capture device 10 may be a stand-alone device, such as a stand-alone camera, or be integrated in another device, such as a wireless communication device. As an example, image capture device 10 may be integrated in a mobile telephone to form a so-called camera phone or video phone. Image capture device 10 preferably is equipped to capture color imagery, black-and-white imagery, or both. In this disclosure, the terms "image," "imagery," "image information," or similar terms may interchangeably refer to either video or still pictures. Likewise, the term "frame" may refer to either a video frame or a still picture frame obtained by image capture device 10.

Sensor array 12 obtains light information from a scene prior to capturing an image frame of the scene. Sensor array 12 includes a two-dimensional array of individual image sensors, e.g., arranged in rows and columns. Sensor array 12 may comprise, for example, an array of solid state sensors such as complementary metal-oxide semiconductor (CMOS) sensors. The image sensors within sensor array 12 are exposed to the scene to obtain light information from the scene and to capture an image frame of the scene.

Light source 22 may correspond to any light source capable of illuminating the foreground of a scene when capturing an image. For example, light source 22 may include internal light sources such as a strobe flash or an array of light emitting diodes (LEDs). In general, light source 22 comprises any controllable light source strong enough to cause a change in light reflected from a foreground object. In some examples, image capture device 10 may interface with external light sources, such as umbrella lights, to illuminate the scene. In general, image capture controller 14 controls light source 22 in coordination with sensor array 12 such that, when a scene is to be illuminated by light source 22, image capture controller 14 causes light source 22 to illuminate at the same time that sensor array 12 begins capturing an image. In general, objects that are relatively closer to image capture device 10 will have a greater difference in reflected light, between a flash image and a non-flash image, than objects that are relatively further away.

Highly reflective surfaces in the background, such as mirrors or other glossy objects, may generate larger differences in luminance values than objects in the foreground. To compensate for this, in some examples, three or more images may be captured with various power levels to light source 22. For example, a first image may be captured at 0% power to light source 22, a second image may be captured at 50% power to light source 22, and a third image may be captured at 100% power to light source 22. The differences between the first and second images may result in a preliminary set of candidate regions, and the differences between the second and third images may be calculated to eliminate regions that likely correspond to specular reflections caused by, for example, mirrors or other glossy surfaces. As another example, the first image may be captured with light source 22 at a relatively low power level and the second image may be captured with light source 22 at a relatively high power level. In this manner, regions including objects that are relatively close to the camera may produce large differences in luminance, while regions in the background that are dark in each image or that are bright in each image may result in very low differences, so such regions may be excluded from the ROI.

Image capture controller 14 controls settings, such as aperture size, shutter speed, sensor gain, and when to capture an image, based on configuration settings, such as settings that have been configured by automatic settings unit 18. Image capture controller 14 may further comprise a user interface, such as any or all of buttons, dials, switches, or a touch screen, for receiving commands from a user. For example, image capture controller 14 may include a button that causes image capture device 10 to capture an image. As another example, image capture controller 14 may include a user interface for zooming an image. Image capture controller 14 may also comprise user interfaces for receiving manual settings for aperture, camera shutter speed, and sensor gain. In this manner, camera settings may be controlled automatically or manually. In the example of FIG. 1, automatic settings unit 18 is configured to perform automatic configuration of settings. Automatic settings unit 18 is an example of a processing unit configured to perform the techniques of this disclosure.

Automatic settings unit 18 utilizes the light information captured by sensor array 12 for preliminary visual front end (VFE) processing, such as automatic focus (AF), automatic exposure (AE), and automatic white balance (AWB). For example, automatic settings unit 18 performs automatic exposure based on the light information from sensor array 12 to select an exposure value (EV) that achieves a default target brightness for a region of interest of the scene. The selected EV defines an aperture size, shutter speed, and/or sensor gain to control the amount of light from the scene that reaches sensor array 12, shutter speed to control an amount of time that sensor array 12 is exposed to the light from the scene, and sensor gain to provide amplification of the light that reaches sensor array 12. For example, a typical default target brightness is approximately 18% gray. Therefore, image capture controller 14 may perform automatic exposure to select an EV that produces an image frame of the scene, where the region of interest has an average brightness value equivalent to approximately 18% gray. Certain circumstances may require a target brightness that is different than 18% gray, for example, when an image is captured of a snowy scene or a dark object. Various heuristics and/or algorithms may be used to determine the target brightness or luma_target for an image.

The techniques for determining the region of interest described in this disclosure may be applied to a variety of uses. For example, the region of interest may be used to estimate light source exposure in order to reduce near object overexposure by adapting the exposure to the region of interest. Image capture device 10 may also be configured to make white balance gain adjustments for the region of interest when light source 22 is powered on for the final image. Image capture device 10 may also be configured to automatically focus on the region of interest, thus focusing on the closest object. The region of interest may also be used to adjust auto-exposure in backlit situations. As another example, image capture device 10 may be configured to fill in close, under-illuminated objects using auto exposure and control of light source 22.

In this manner, image capture device 10 may control light source 22 to prevent the region of interest from becoming saturated or burned out (e.g., overexposed), as well as to prevent overexposure of close objects in dark situations where the background is dark and far away from the image capture device. As still another example, image capture device 10 may be configured to perform auto-exposure relative only to the region of interest. By determining the closest object, the auto-focus procedure may be configured to focus on the region of interest, even when the region of interest contains less high frequency content than the background. Similarly, auto-focus may be directed to the region of interest, rather than on the center of the image.

In particular, automatic settings unit 18 causes image capture device 10 to capture preliminary images to configure settings for image capture controller 14 when image capture controller 14 receives an indication that an image is to be captured. For example, when a user presses an image capture button, image capture controller 14 activates sensor array 12 to capture a first image without activating light source 22. Then, after the first image is captured, image capture controller 14 activates sensor array 12 to capture a second image while activating light source 22. In general, the time between the first image and the second image depends upon a type of sensor used to capture the images, light source 22, and the frame rate and/or shutter speed of image capture device 10. Image processor 16 receives the images from sensor array 12 and stores them in image store 20. Region of interest detection unit 24 determines a region of interest using the two images, and automatic settings unit 18 configures camera settings based on the region of interest. Then, image capture controller 14 captures a third image using the settings that were configured based on the region of interest determined from the first two images. Image capture controller 14 may activate light source 22 while taking the third image, or may determine not to activate light source 22, based on either automatic or manual configuration settings.

To determine the region of interest, region of interest detection unit 24 divides each of the two images into a plurality of regions, where each region of the first image corresponds to a collocated region of the second image. Region of interest detection unit 24 calculates luminance difference values for each region by calculating the difference between a luminance value for the region in the first image and a luminance value for the collocated region in the second image.

The luminance value for a region may comprise an aggregate luminance value for all luminance pixels in the region. In general, digital images may be represented by three values assigned to each pixel: chrominance values that represent color (Cb and Cr) and a luminance value that represents brightness (Y or luma). Other examples may use other color spaces, such as red-green-blue (RGB), hue-saturation-value (HSV), or any other color space that can provide information on brightness. Region of interest detection unit 24 may add the values of all luminance pixels in the region to produce the luminance value for the region. In another example, region of interest detection unit 24 calculates the luminance value for the region by calculating the average value for the luminance pixels in the region. In any case, region of interest detection unit 24 calculates luminance values for each region of the first image and each collocated region of the second image, and then calculates the difference between each pair of collocated regions to produce a set of luminance difference values.

To determine whether a region should be included in the region of interest, region of interest detection unit 24 compares the luminance difference value for the region to a threshold value stored in threshold storage 26. In some examples, the threshold value is pre-configured. In other examples, region of interest detection unit 24 calculates the threshold for the image as the maximum luminance difference value, offset by a bias value. The bias value may comprise a percentage of the maximum luminance value, for example, fifty percent, or may comprise a fixed value. When the bias value comprises a percentage value, that is, a rational number between zero and one, region of interest detection unit 24 may calculate the threshold by multiplying the maximum luminance value by the bias value. On the other hand, when the bias value comprises a fixed value, region of interest detection unit 24 may calculate the threshold by subtracting the bias value from the maximum luminance value. The bias value may also be stored in threshold storage 26, and may comprise a pre-configured value, or a user may modify the bias value, in some examples. Threshold storage 26 may comprise any suitable computer-readable storage medium for storing such values, for example, flash memory.

Region of interest detection unit 24 may then determine which regions should be included in the region of interest. In one example, region of interest detection unit 24 includes each region having a luminance difference value greater than the threshold in the region of interest. The region of interest may comprise any subset of regions of the image, and the regions in the region of interest need not be contiguous. After determining the region of interest, automatic settings unit 18 may perform automatic settings configuration based on the region of interest.

Automatic settings unit 18 may be implemented as an independent hardware component or as a programmable feature of a logic device, such as a microprocessor, DSP or the like. In some examples, automatic settings unit 18 may be a programmable or integrated feature of a logic device implementing image processor 16. In particular, automatic settings unit 18 may be implemented as one or more software processes executed by such a logic device.

Automatic settings unit 18 may then perform automatic exposure based on the target brightness of the determined region of interest to select an EV for the target brightness. Image capture controller 14 may adjust the aperture size, shutter speed, and/or sensor gain according to the settings determined by automatic settings unit 18. Sensor array 12 may then capture an image frame of the scene using the EV. Using the EV, sensor array 12 receives light from the scene with an aperture size defined by the selected EV, and resets with a shutter speed defined by the selected EV. Sensor array 12 provides the captured image frame to image processor 16 for processing and storage in image storage device 20.

Image processor 16 receives the captured image frame from sensor array 12 and performs any necessary processing on the image frame. Image processor 16 may, for example, perform filtering, cropping, demosaicing, compression, image enhancement, or other processing of the image frame captured by sensor array 12. Image processor 16 may be realized by a microprocessor, digital signal processor (DSP), application specification integrated circuit (ASIC), field programmable gate array (FPGA), or any other equivalent discrete or integrated logic circuitry. In some examples, image processor 16 may form part of an encoder-decoder (CODEC) that encodes the image frame according to a particular encoding technique or format, such as MPEG-2, MPEG-4, ITU H.263, ITU H.264, JPEG, or the like.

Image processor 16 stores the image frame in image storage device 20. Image processor 16 may store raw image frames, processed image frames, or encoded image frames in image storage device 20. If the imagery is accompanied by audio information, the audio also may be stored in image storage device 20, either independently or in conjunction with the image frames. Image storage device 20 may comprise any volatile or non-volatile memory or storage device, such as read-only memory (ROM), electrically erasable programmable read-only memory (EEPROM), or FLASH memory, or such as a magnetic data storage device or optical data storage device. In some examples, image capture device 10 may further comprise a display for displaying either or both of current images being captured by sensor array 12 (such that the display acts as a viewfinder) or previously captured images stored in image store 20.

Figure 2:
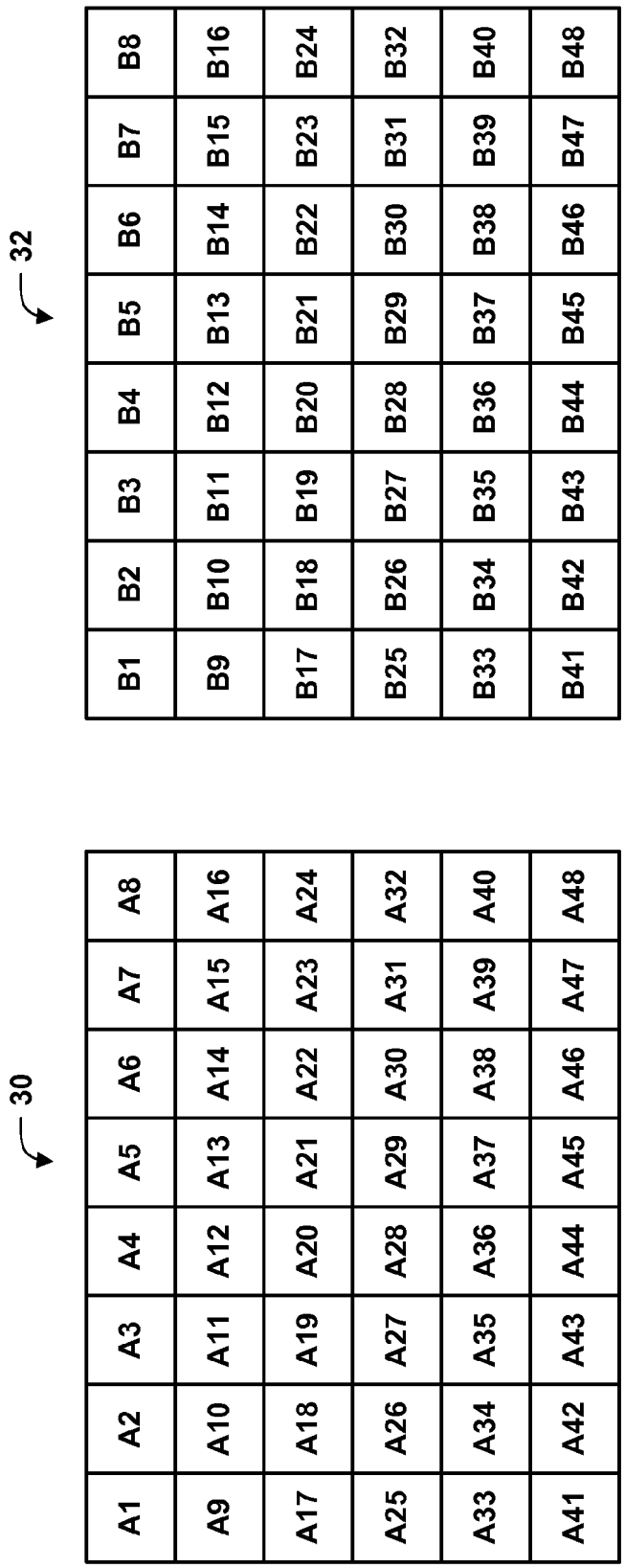
FIG. 2 is a conceptual diagram illustrating two images that have been divided into corresponding regions for determining which of the regions should be included in a region of interest.

FIG. 2 is a conceptual diagram illustrating two pictures 30, 32 that have been divided into corresponding regions for determining which of the regions should be included in a region of interest. Picture 30 represents a first picture captured by image capture device 10 (FIG. 1) while light source 22 is at a first power level, e.g., powered off or at a relatively low power level, and picture 32 represents a second picture captured by image capture device 10 while light source 22 is at a second power level that is higher than the first power level, e.g., powered on at up to full power. In other examples, the first image may be captured while light source 22 is powered on and the second image may be captured while light source 22 is powered off. In general, the ordering of which image is captured with light source 22 powered on does not matter, so long as an image is captured with light source 22 powered on and another image is captured with light source 22 powered off or at a relatively lower power level. Similarly, in other examples, the two images may be captured while light source 22 is powered at different power levels, such that at least one image is captured while light source 22 is at a power level that is greater than the power level of light source 22 for the other image. Pictures 30, 32 are each pictures of the same scene, and may be captured in rapid succession to ensure that any difference between the scenes of pictures 30, 32 due to movement (for example, hand jitter) is minimal.

As discussed above, region of interest detection unit 24 divides pictures, such as pictures 30, 32, into a plurality of regions. FIG. 2 represents picture 30 as having 48 individual regions, identified using labels "A1" through "A48." FIG. 2 also represents picture 32 as having 48 individual regions, identified using labels "B1" through "B48." The number of regions illustrated in FIG. 2 is merely an example for the purpose of illustration. In general, region of interest detection unit 24 may divide a picture into any number of regions.

A region of picture 30 is collocated with a region of picture 32 when the labels of the two regions have the same numeral. For example, region A1 of picture 30 is collocated with region B1 of picture 32. Similarly, region A24 of picture 30 is collocated with region B24 of picture 32. In this manner, each region of picture 30 has a collocated region of picture 32.

Each region includes a plurality of pixels, e.g., chrominance and luminance values for pixels. As described above, region of interest detection unit 24 calculates a luminance value for each region of pictures 30, 32. In one example, region of interest detection unit 24 calculates a luminance value for a region by calculating the sum of all luminance pixels in the region. In another example, region of interest detection unit 24 calculates a luminance value for a region by calculating the average of all luminance pixels in the region.

Region of interest detection unit 24 also calculates differences between each collocated region of picture 30 and picture 32. For example, region of interest detection unit 24 calculates the difference between the luminance value of region A1 of picture 30 and the luminance value of region B1 of picture 32. In some examples, region of interest detection unit 24 also determines which of the calculated luminance differences is the maximum difference, and uses the maximum difference to calculate a threshold value. Region of interest detection unit 24 may multiply the maximum difference by a bias value to produce the threshold. In other examples, region of interest detection unit 24 uses a pre-configured threshold value.

To determine which of the regions should be included in a region of interest, region of interest detection unit 24 compares each of the calculated differences to the threshold value.

When the difference between two collocated regions is equal to or exceeds the threshold value, region of interest detection unit 24 includes the region in the region of interest. In this manner, the region of interest includes regions having a luminance difference that is greater than or equal to the threshold value. Automatic settings unit 18 may then use the regions in the region of interest for performing automatic configurations, such as, for example, auto-exposure, auto-white balance, and/or auto-focus.

Image capture device 10 may then use the configured settings to capture a third image of the scene represented in pictures 30, 32. Image capture device 10 may be configured to capture the third image as soon as the processing and automatic configuration has completed. In this manner, a user may press an image capture button only once, and the button press may cause image capture device 10 to capture the first two images, automatically configure image capture device 10, and then capture a third image with the settings resulting from automatic configuration. Hence, in this example, all three images are obtained in response to a single depression of a button or other control medium. In some examples, additional images may be captured to determine the region of interest, e.g., by providing variable amounts of power to light source 22.

Figure 3:
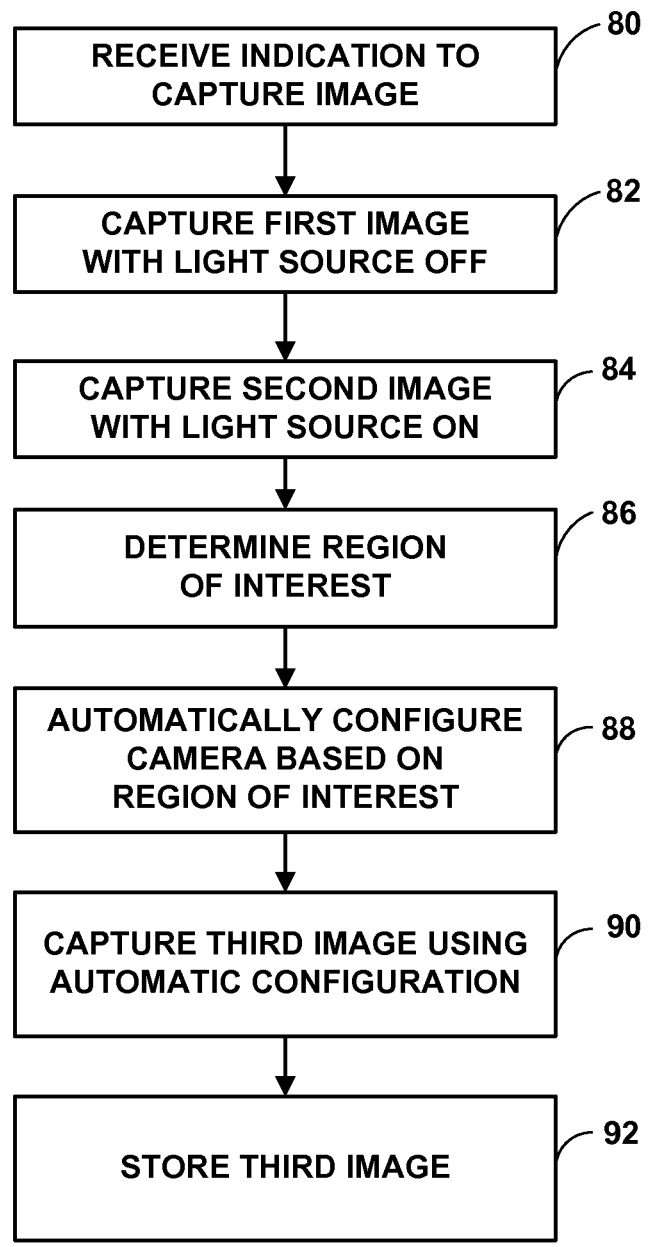
FIG. 3 is a flowchart illustrating an example method for capturing an image of s scene using settings that are automatically configured based on a determined region of interest.

FIG. 3 is a flowchart illustrating an example method for capturing an image using settings that are automatically configured based on a determined region of interest. Initially, an image capture device, such as image capture device 10, receives an indication to capture an image (80). For example, a user may press a button to cause image capture device 10 to capture an image. As another example, image capture device 10 may be configured to capture an image after expiration of a timer. As still another example, image capture device 10 may be controlled by a remote computing device coupled to image capture device 10 that sends a signal to image capture device 10 to capture an image.

After receiving the indication to capture an image, image capture device 10 captures a first preliminary image without activating light source 22 (82), i.e., with the light source off, or in some examples, with light source 22 at a relatively low power level. Image capture device 10 also captures a second preliminary image while activating light source 22 (84), i.e., with the light source on, or otherwise at a power level that is relatively higher than the power level of the first image. Image capture device 10 may capture the second preliminary image in rapid succession, e.g., within 4 milliseconds to one second, depending on light source 22 and a frame rate of image capture device 10, following the capture of the first preliminary image.

For example, where light source 22 comprises a strobe flash such as a Xenon type flash, and sensor array 12 corresponds to a rolling shutter, image capture device 10 may generally capture the first and second images in two contiguous frames. Therefore, the time between the two images may be the time between capturing two frames. For example, where the frame rate is sixty frames per second, the time between the two images may be approximately 67 milliseconds. As another example, where the frame rate is five frames per second, the time between the two images may be approximately 200 milliseconds. When the frame rate is one frame per second, the time between the two images may be approximately one second. In general, a higher frame rate may produce relatively better results.

As another example, where light source 22 comprises an LED lamp and sensor array 12 corresponds to a rolling shutter, the LED lamp for light source 22 may be on for two full frames, in order to ensure that an image is fully exposed. Therefore, the time between the first image and the second image may be the time for three frames. For example, where image capture device 10 has a frame rate of sixty frames per second, the time to capture the two images may be approximately 133 milliseconds. As another example, where image capture device 10 has a frame rate of one frame per second, the time to capture the two images may be two seconds. As another example, where image capture device 10 has a frame rate of five frames per second, the time between capturing the two images may be 400 milliseconds. In another example, where sensor array 12 corresponds to a charge-coupled device (CCD) sensor, regardless of whether light source 22 is a strobe or an LED, the amount of time between capturing the first and second images may depend upon the shutter speed.

Image capture controller 14 or image processor 16 may receive the two preliminary images from sensor array 12 and pass the images to automatic settings unit 18. In other examples, the first image may be captured while light source 22 is powered on and the second image may be captured while light source 22 is powered off. In still other examples, image capture device 10 may capture a plurality of images, e.g., with various levels of power to light source 22. For example, image capture device 10 may capture a first image with light source 22 powered off, a second image with light source 22 at 50% power, and a third image with light source 22 at 100% power. In this manner, image capture device 10 may exclude specular reflections resulting from highly reflective surfaces of background objects from the region of interest, e.g., by removing regions from the region of interest that have a relatively low luminance difference between the second and third images.

Region of interest detection unit 24 may then process the two images to determine a region of interest (86). In general, portions of the second preliminary image that are relatively brighter than collocated portions of the first preliminary image and produce a higher luminance difference when compared to the collocated portions. ON this basis, brighter portions are included in the region of interest. Automatic settings unit 18 may then automatically configure image capture device 10 based on the region of interest (88). After image capture device 10 is configured, image capture device 10 may capture a third image using the configuration (90) and store the third image in image storage 20 (92). Image capture device 10 may be configured to activate light source 22 while capturing the third image, or image capture device 10 may be configured to automatically determine whether use of light source 22 is required for capturing the third image, e.g., whether the scene is in a low-light condition. The first and second preliminary images and the third stored image are all generally directed to the same scene. After the two preliminary images are used to automatically configure image capture device 10, the two preliminary images may be discarded.

Figure 4:
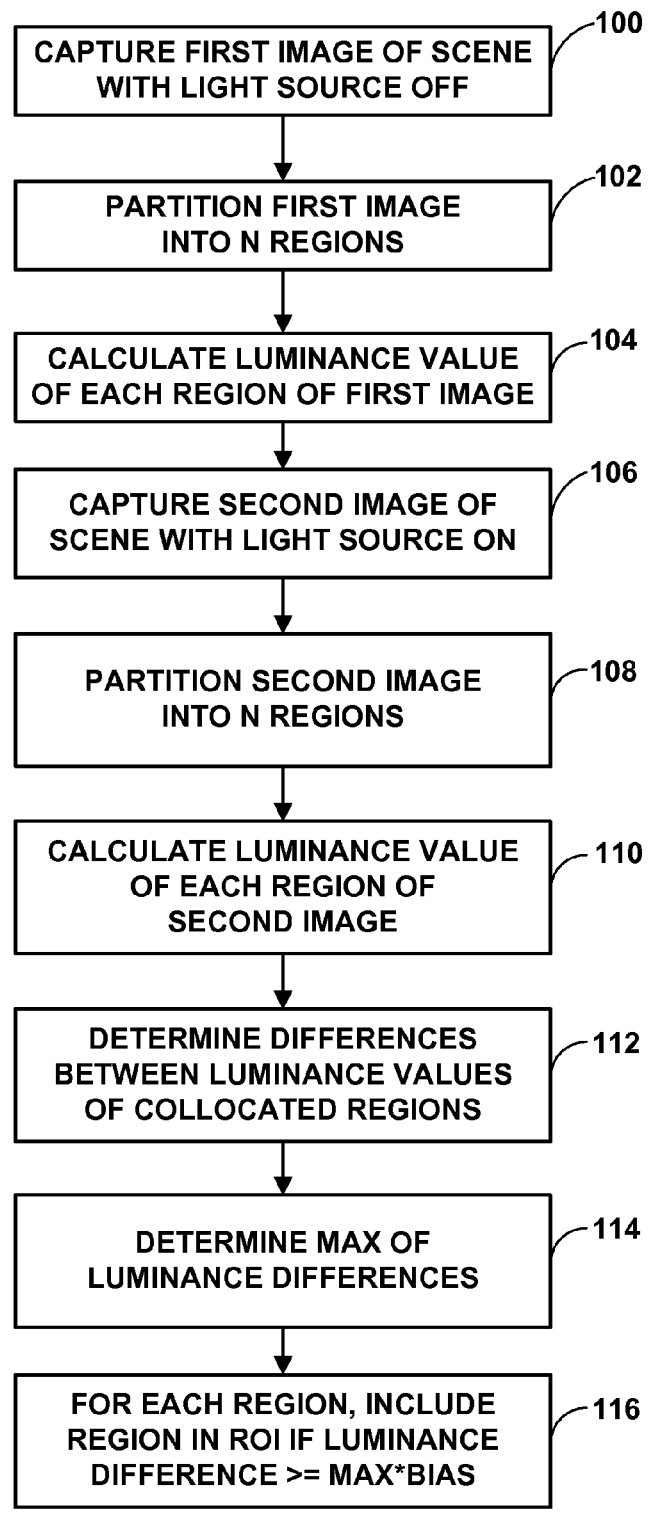
FIG. 4 is a flowchart illustrating an example method for automatically determining a region of interest of a scene.

FIG. 4 is a flowchart illustrating an example method for automatically determining a region of interest of an image. The method of FIG. 4 illustrates one example method for performing steps 82-86 of FIG. 3 in greater detail. Initially, in this example, image capture device 10 captures a first image of a scene with light source 22 powered off, or at a relatively low power level in some examples (100). Region of interest detection unit 24 receives the first image and divides the first image into N regions, where N is an integer greater than zero (102). For example, region of interest detection unit 24 may divide the first image into a plurality of equally-sized rectangular regions, as shown in FIG. 2.

Region of interest detection unit 24 then calculates a luminance value for each of the plurality of regions (104). In one example, region of interest detection unit 24 accumulates the values of each luminance pixel in a region and treats the summation of the luminance pixel values as the luminance value for the region. In another example, region of interest detection unit 24 calculates the average of the luminance pixel values as the luminance value for the region.

Image capture device 10 also captures a second image while light source 22 is powered on, or in some examples, at a power level that is higher than the power level used to capture the first image (106). Region of interest detection unit 24 divides the second image into a plurality of regions that are collocated with the regions of the first image (108). In this manner, the regions of the second image are the same in number, shape, and size as the collocated regions of the first image, e.g., as shown in FIG. 2. Region of interest detection unit 24 also calculates luminance values for the regions of the second image using the same method used to calculate luminance values for the regions of the first image (110).

Region of interest detection unit 24 may then calculate the difference between the luminance values of each of the regions in the second image and the luminance values of each of the collocated regions in the first image (112). That is, region of interest detection unit 24 may iterate through each collocated region between the first and second image and calculate the difference between the luminance values for the region in the first image and the region in the second image. In this manner, region of interest detection unit 24 produces a plurality of luminance difference values, where each luminance difference value corresponds to one of the regions. In the example of FIG. 4, region of interest detection unit 24 also determines which of the luminance differences is the maximum luminance difference. In some examples, two separate regions may be merged together to form a single, contiguous region of interest, but in other examples, each individual region may be used separately to form the region of interest.

Region of interest detection unit 24 then determines which of the regions to include in the region of interest. In this example, region of interest detection unit 24 includes a region in the region of interest when the luminance difference value is equal to or exceeds a threshold value, which in this example, is the product of the maximum luminance difference and a bias value, e.g., a pre-configured percentage value. Thus, for each region, region of interest detection unit 24 includes the region in the region of interest (ROI) if the luminance difference for the region is equal to or exceeds the threshold value (116). In other examples, region of interest detection unit 24 may include the region in the region of interest only when the luminance difference strictly exceeds the threshold value.

The example method of FIG. 4 can be summarized as follows. While light source 22 is powered off (or while light source 22 is at a relatively low power level), image capture device 10 captures a first image and partitions the image into a predetermined number of regions, calculating for each region the sum or average of each pixel luminance. Then, while light source 22 is powered on (or while light source 22 is at a power level higher than that used while capturing the first image), image capture device 10 captures a second image and partitions the image into the same number of regions, again calculating for each region the sum or average of each pixel luminance. Image capture device 10 then calculates a luminance difference for each region between the first image and the second image. Then, the regions with a relatively large luminance difference are considered part of the region of interest.

Figure 5:
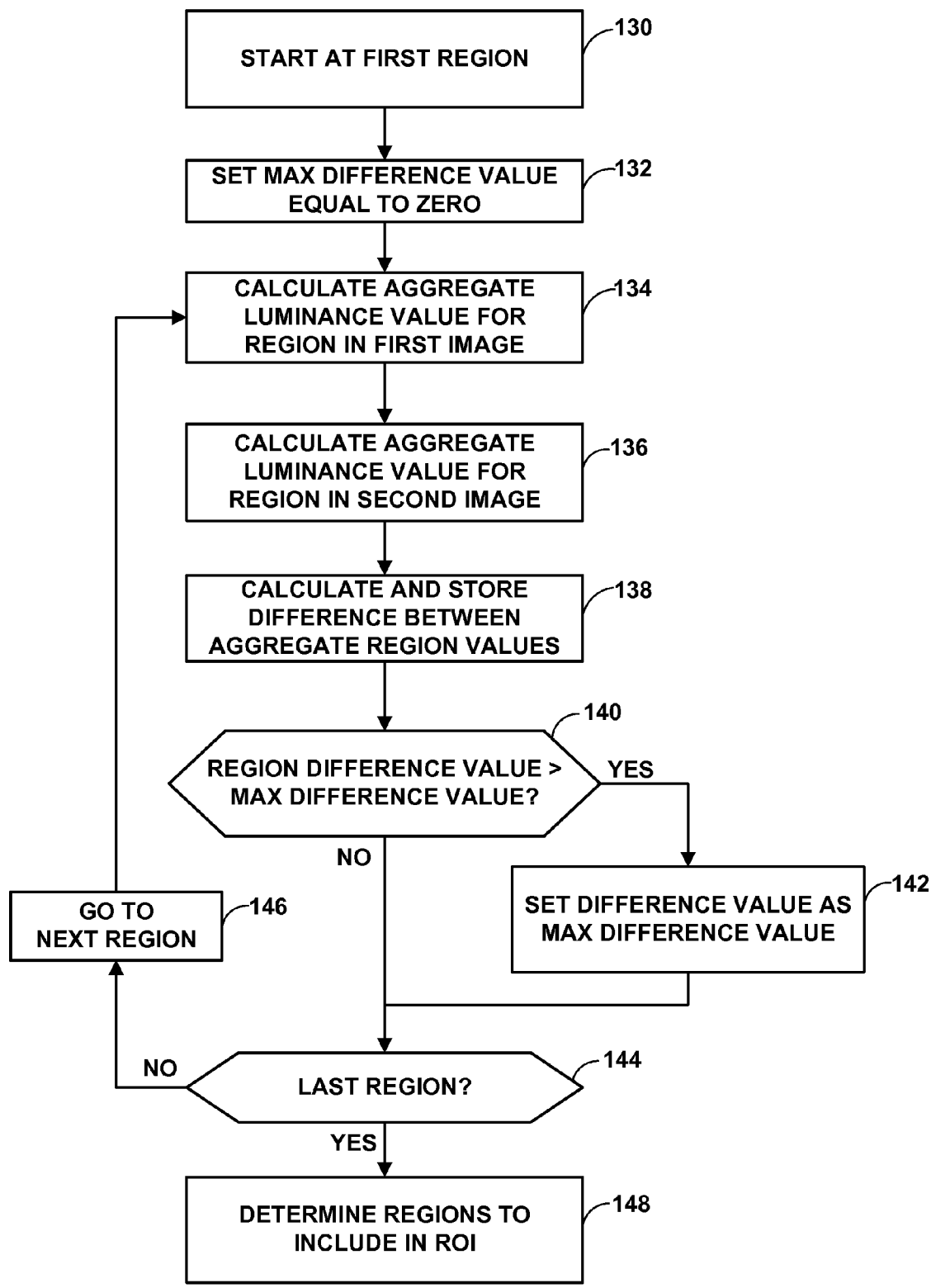
FIG. 5 is a flowchart illustrating an example method for calculating luminance values for each of a plurality of regions of a set of two images of a scene and for determining the maximum difference between luminance values for regions of the two images.

FIG. 5 is a flowchart illustrating an example method for calculating luminance values for each of a plurality of regions of a set of two images and for determining the maximum difference between luminance values for regions of the two images. The method of FIG. 5 is an example for performing steps 104 and 110-114 of FIG. 4. Initially, region of interest detection unit 24 begins at the first region that is collocated between the first image and the second image (130). With respect to the example of FIG. 2, region of interest detection unit 24 may begin at region A1 of picture 30. Region of interest detection unit 24 also initializes the maximum difference value by setting the maximum difference value equal to zero (132).

Region of interest detection unit 24 then calculates an aggregate luminance value for the current region in the first image (134). In one example, region of interest detection unit 24 calculates the sum of all luminance pixel values in the region as the aggregate luminance value. In another example, region of interest detection unit 24 calculates the average of all luminance pixel values in the region as the aggregate luminance value. Region of interest detection unit 24 also calculates an aggregate luminance value for the collocated region in the second image, using the same aggregation method as used for the region of the first image (136).

Region of interest detection unit 24 then calculates the difference between the aggregate luminance value of the region in the second image and the aggregate luminance value of the collocated region in the first image (138). With respect to the example of FIG. 2, region of interest detection unit 24 calculates luminance_value(BN)−luminance_value (AN), where N is a number representative of the current region, A represents the first image, and B represents the second image. Region of interest detection unit 24 also stores the calculated difference value, e.g., in a data structure such as an array or a matrix, or other suitable data structure, e.g., a linked list. As an example, region of interest detection unit 24 may perform the operation difference[N]=luminance_value(BN)−luminance_value (AN), where N is a number representative of the current region.

In another example, region of interest detection unit 24 may calculate the absolute value of the difference described above, that is, difference[N]=|luminance_value(BN)−luminance_value (AN)|, where N is a number representative of the current region. In still another example, region of interest detection unit 24 may calculate a ratio between the luminance values of the regions, rather than the difference, e.g., to determine whether luminance_value(BN)/luminance_value(AN)>threshold or luminance_value(AN)/luminance_value(BN)>threshold. In another example, region of interest detection unit 24 may convert the luminance values to decibels (dB) by calculating a logarithm to the values and then add the two values produced by the logarithms, or calculating a ratio of the two values produced by the logarithms, to determine the difference. In general, any method for comparing the brightness of the two images may be used to calculate the differences in brightness of the two images.

Region of interest detection unit 24 may then determine whether the current difference value is greater than the current maximum difference value (140), e.g., to determine whether to reset the value of the maximum difference value. When the current difference value for the current region is greater than the maximum difference value ("YES" branch of 140), region of interest detection unit 24 sets the maximum difference value equal to the current region difference value (142).

Region of interest detection unit 24 then determines whether the current region is the last region for comparison (144). When the current region is not the last region, region of interest detection unit 24 proceeds to the next region (146) and processes the next region. For example, assuming that the current region is N, region of interest detection unit proceeds to perform steps 134-142 with respect to region N+1. On the other hand, when the current region is the last region to be processed ("YES" branch of 144), region of interest detection unit 24 determines which of the plurality of regions to include in a region of interest (148).

Figure 6:
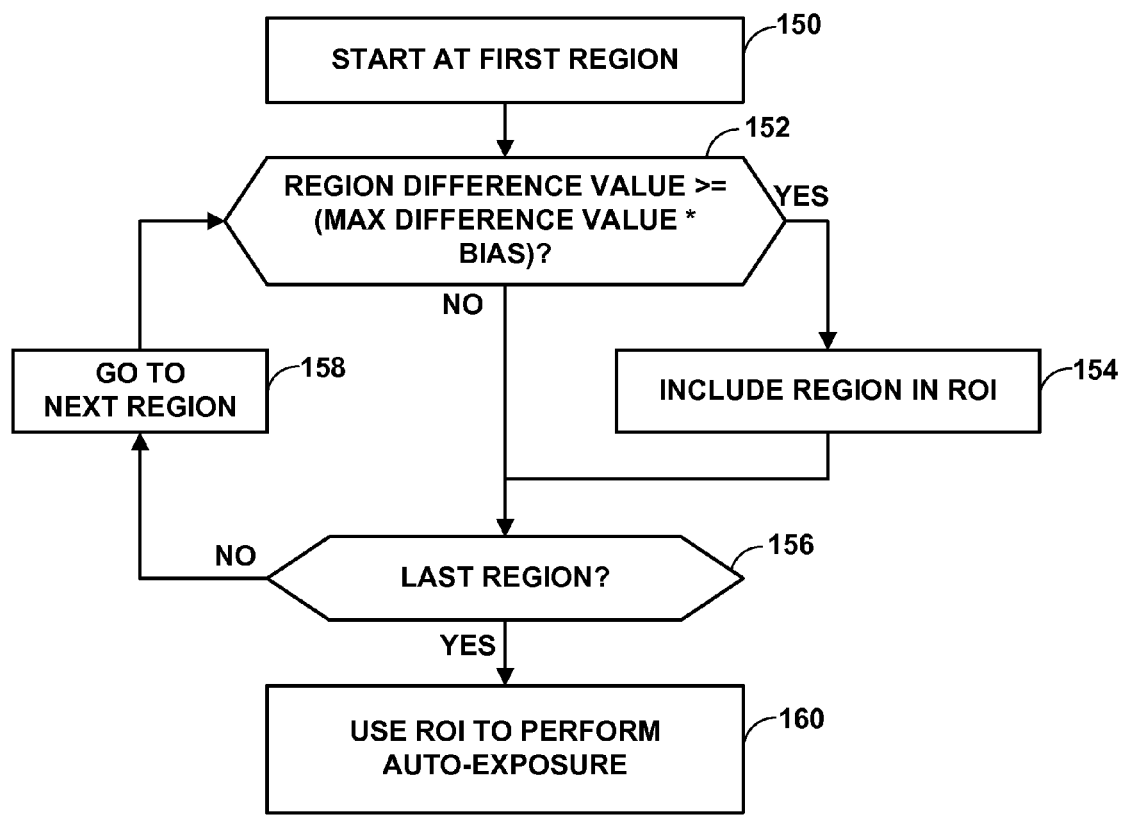
FIG. 6 is a flowchart illustrating an example method for using luminance difference values for each of a plurality of regions to determine which of the plurality of regions should be included as part of a region of interest.

FIG. 6 is a flowchart illustrating an example method for using luminance difference values for each of a plurality of regions (for example, as calculated according to the method of FIG. 5) to determine which of the plurality of regions to include as part of a region of interest. The example method of FIG. 6 may correspond to step 148 of FIG. 5. Region of interest detection unit 24 begins with the first region (150) and determines whether the luminance difference value for the region is greater than or equal to a threshold value (152). In the example of FIG. 6, the threshold value is the product of the maximum difference value and a bias value.

When the luminance difference for the region is greater than or equal to the threshold value (max difference value*bias) ("YES" branch of 152), region of interest detection unit 24 includes the region as part of the region of interest (154). Region of interest detection unit 24 then determines whether the current region is the last region (156). When the current region is not the last region ("NO" branch of 156), region of interest detection unit 24 proceeds to process the next region (158).

On the other hand, when the current region is the last region ("YES" branch of 156), region of interest detection unit 24 produces the region of interest for automatic settings unit 18. For example, region of interest detection unit 24 may produce a data structure that comprises indices of regions that are included in the region of interest. Automatic settings unit 18 may then use the region of interest to automatically configure image capture device 10, e.g., by performing auto-exposure with respect to the region of interest (160).

Figure 7:
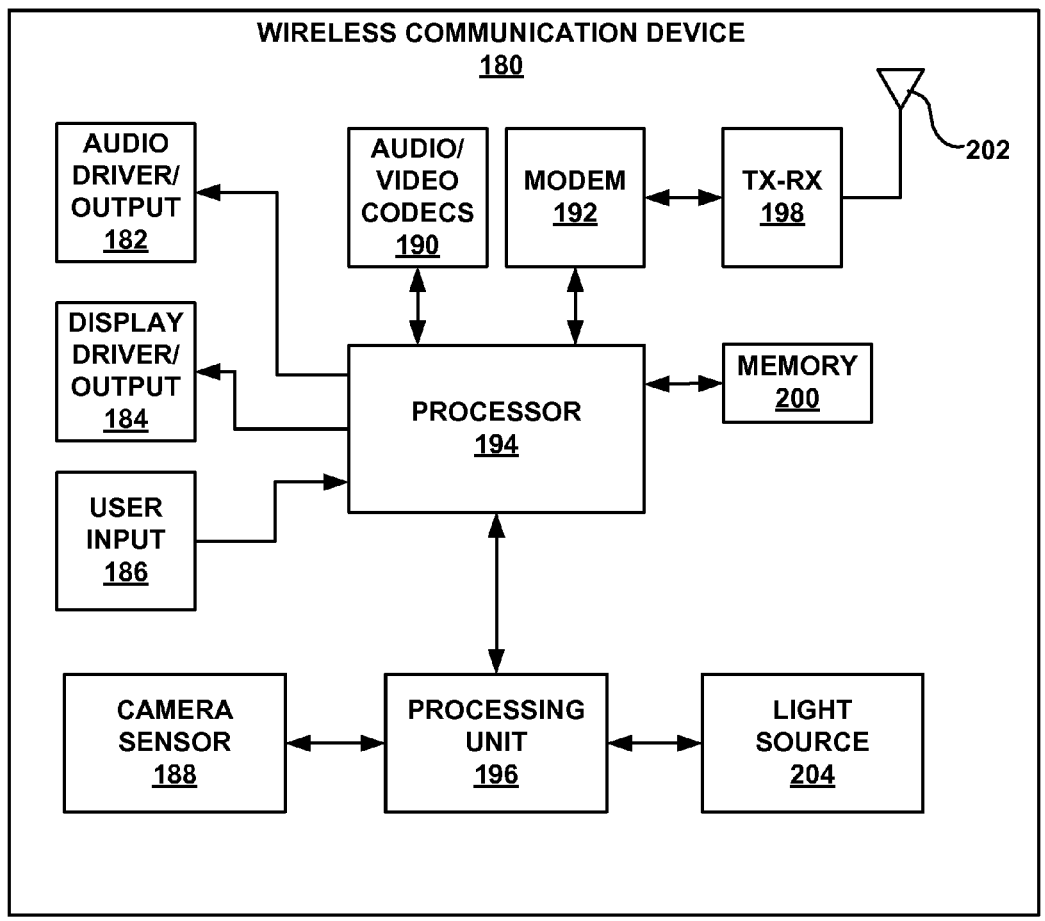
FIG. 7 is a block diagram illustrating an example wireless communication device configured to automatically determining a region of interest.

FIG. 7 is a block diagram illustrating an example wireless communication device 180 configured to utilize the techniques of this disclosure for automatically determining a region of interest to, for example, configure auto-exposure settings for camera sensor 188 of wireless communication device 180. Camera sensors may be provided within wireless communication devices such as a mobile radiotelephone to form a so-called camera phone or video phone. In the example of FIG. 6, wireless communication device 180 may include various components of image capture device 10 (FIG. 1), as well as various components to support wireless communication and user interface features. For example, wireless communication device 180 may include a processor 194, audio/video encoders/decoders (CODECs) 190, a memory 200, a modem 192, a transmit-receive (TX/RX) unit 198, a radio frequency (RF) antenna 202, a user input device 186, a display driver/output device 184, an audio driver/output device 162, a camera sensor 188, a light source 204, and a processing unit 196. Processor 194 may be used to execute the automatic configuration and region of interest detection techniques described in this disclosure.

Camera sensor 188 captures information and sends the captured information to processing unit 196. Processing unit 196 may automatically calibrate camera sensor 188 based on a detected region of interest, e.g., to perform automatic exposure, automatic white balance, and/or automatic focus, in order to configure camera sensor 188, such as an aperture size, shutter speed, and sensor gain for camera sensor 188. In this manner, processor 194 may execute the techniques performed by automatic settings unit 18 of image capture device 10 of FIG. 1. Processing unit 196 may control a power level of light source 204 to capture images while light source 204 is powered at various power levels, as described in detail in this disclosure. Light source 204 may comprise, for example, an LED or a strobe flash, such as a Xenon flash.

In addition, processor 194 may also control a display driver and associated display output 184 and an audio driver and associated audio output 182 to present images, video, and/or associated sounds to the user via a display and speaker associated with the wireless communication device 180. Memory 200 may store instructions for execution by processor 194 to support various operations. Although not shown in FIG. 6, memory 200 (or another memory) may be coupled to processing unit 196 or other components to store data that is processed or generated by such components. User input device 186 may include any of a variety of input media such as keys, buttons, touchscreen media or the like for the user to control operation of wireless communication device 180.

The images and audio and imagery or video may be encoded by audio/video CODECs 190 for storage and transmission. In the example of FIG. 6, audio/video CODECs may reside with the larger wireless communication device 180 to handle a variety of audio and video applications, in addition to video that may be captured by camera sensor 188. Audio-video CODECs may encode images or video according to any of a variety of encoding techniques or formats, such as MPEG-2, MPEG-4, ITU H.263, ITU H.264, JPEG, or the like.

In addition, in some aspects, wireless communication device 180 may encode and transmit such audio, images or video to other devices by wireless communication, as well as receive audio, images or video from other devices and encode it. For example, modem 192 and TX-RX unit 198 may be used to transmit encoded audio and image or video information to other wireless communication devices via antenna 202. Modem 192 may modulate the encoded information for transmission over the air interface provided by TX-RX unit 198 and antenna 202. In addition, TX-RX unit 198 and modem 192 may process signals received via antenna 202, including encoded audio, imagery or video. TX-RX unit 198 may further include suitable mixer, filter, and amplifier circuitry to support wireless transmission and reception via antenna 202.

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media or communication media including any medium that facilitates transfer of a computer program from one place to another. Data storage media may be any available media that can be accessed by one or more computers or one or more processors to retrieve instructions, code and/or data structures for implementation of the techniques described in this disclosure. By way of example, and not limitation, such computer-readable media can comprise RAM, ROM, EEPROM, CD-ROM or other optical disk storage, magnetic disk storage, or other magnetic storage devices, flash memory, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware.

Various examples have been described. These and other examples are within the scope of the following claims.

The invention claimed is:

1. A method comprising:
   capturing, with an image capture device, a first image of a scene while a controlled light source is at a first power level;
   capturing, with the image capture device, a second image of the scene while the controlled light source is at a second power level that is higher than the first power level;
   calculating luminance measurements for a plurality of regions in the first image, and a plurality of collocated regions in the second image;
   calculating luminance differences between the plurality of regions in the first image and the plurality of collocated regions in the second image;
   determining a difference threshold based on a maximum of the luminance differences;
   determining that a region of interest includes a plurality of regions whose luminance differences exceed the difference threshold.

2. The method of claim 1, further comprising:
   calculating the difference threshold by multiplying the maximum of the luminance differences by a bias value.

3. The method of claim 2, further comprising:
   automatically configuring settings of the image capture device based on the region of interest; and
   capturing, with the image capture device, a third image of the scene using the automatically configured settings.

4. The method of claim 3, wherein automatically configuring settings comprises performing an auto-exposure process to set an exposure setting based on the region of interest.

5. The method of claim 3, wherein automatically configuring settings comprises performing an auto-white balance process to set a white balance setting based on the region of interest.

6. The method of claim 3, wherein automatically configuring settings comprises performing an auto-focus process to set an auto-focus setting based on the region of interest.

7. The method of claim 3, further comprising receiving a command to capture an image, wherein capturing the first image is responsive to the command, wherein capturing the second image is responsive to the command, and wherein capturing the third image is responsive to the command.

8. The method of claim 2, wherein calculating luminance differences comprises, for each of the plurality of regions:
   calculating a sum of pixel luminance values for the region of the first image;
   calculating a sum of pixel luminance values for the collocated region of the second image; and
   calculating a difference between the sum of the pixel luminance values of the region of the first image and the sums of the luminance values of the collocated region of the second image.

9. The method of claim 2, wherein calculating luminance differences comprises, for each of the plurality of regions:
   calculating an average of pixel luminance values for the region of the first image;
   calculating an average of pixel luminance values for the collocated region of the second image; and
   calculating a difference between the average of the pixel luminance values of the region of the first image and the average of the luminance values of the collocated region of the second image.

10. The method of claim 1, wherein calculating luminance differences between the plurality of regions in the first image and the plurality of collocated regions in the second image comprises calculating logarithms of the luminance measurements of the plurality of regions in the first image and the luminance measurements of the plurality of collated regions in the second image.

11. The method of claim 10, wherein calculating luminance differences between the plurality of regions in the first image and the plurality of collocated regions in the second image further comprises adding the logarithms of the luminance measurements of the plurality of regions in the first image and the corresponding logarithms of the luminance measurements of the plurality of collated regions in the second image.

12. The method of claim 1, wherein calculating luminance differences between the plurality of regions in the first image and the plurality of collocated regions in the second image comprises calculating ratios of the luminance measurements of the plurality of regions in the first image and the luminance measurements of the plurality of collated regions in the second image.

13. An apparatus comprising:
   a controlled light source;
   an image sensor configured to capture images; and
   a processing unit configured to cause the image sensor to capture a first image of a scene while the controlled light source is at a first power level,
   cause the image sensor to capture a second image of the scene while the controlled light source is at a second power level that is higher than the first power level,
   calculate luminance measurements for a plurality of regions in the first image and a plurality of collocated regions in the second image,
   calculate luminance differences between the plurality of regions in the first image and the plurality of collocated regions in the second image,
   determine a difference threshold based on a maximum of the luminance differences;

and determine that a region of interest includes a plurality of regions for which a difference in the luminance measurements in the first and second image is above the difference threshold.

14. The apparatus of claim 13, wherein calculating luminance differences between the plurality of regions in the first image and the plurality of collocated regions in the second image comprises calculating ratios of the luminance measurements of the plurality of regions in the first image and the luminance measurements of the plurality of collated regions in the second image.

15. The apparatus of claim 13, wherein the processing unit is further configured to automatically configure settings of the image sensor based on the region of interest and to cause the image sensor to capture a third image of the scene using the automatically configured settings.

16. The apparatus of claim 15, wherein to automatically configure the settings, the processing unit is configured to perform at least one of auto-exposure, auto-white balance, and auto-focus based on the region of interest.

17. The apparatus of claim 15, further comprising an interface for receiving a command to capture the third image, wherein the processing unit is configured to cause the image sensor to capture each of the first image, the second image, and the third image in response to the command.

18. The apparatus of claim 13, wherein to calculate the luminance differences for each of the plurality of regions, the processing unit is configured to calculate a sum of pixel luminance values for the region of the first image, calculate a sum of pixel luminance values for the collocated region of the second image, and calculate a difference between the sum of the pixel luminance values of the region of the first image and the sums of the luminance values of the collocated region of the second image.

19. The apparatus of claim 13, wherein to calculate the luminance differences for each of the plurality of regions, the processing unit is configured to calculate an average of pixel luminance values for the region of the first image, calculate an average of pixel luminance values for the collocated region of the second image, and calculate a difference between the average of the pixel luminance values of the region of the first image and the average of the luminance values of the collocated region of the second image.

20. The apparatus of claim 13, wherein the processing unit is configured to cause the image sensor to capture the second image within 400 milliseconds of capturing the first image.

21. The apparatus of claim 13, wherein the processing unit is configured to calculate luminance differences between the plurality of regions in the first image and the plurality of collocated regions in the second image by calculating logarithms of the luminance measurements of the plurality of regions in the first image and the luminance measurements of the plurality of collated regions in the second image.

22. The apparatus of claim 21, wherein the processing unit is configured to calculate luminance differences between the plurality of regions in the first image and the plurality of collocated regions in the second image by adding the logarithms of the luminance measurements of the plurality of regions in the first image and the corresponding logarithms of the luminance measurements of the plurality of collated regions in the second image.

23. The apparatus of claim 13, wherein the apparatus comprises at least one of:
an integrated circuit;
a microprocessor, and
a wireless communication device that includes the processing unit.

24. An apparatus comprising:
means for providing controllable illumination;
means for capturing a first image of a scene while the means for providing controllable illumination is at a first power level;
means for capturing a second image of the scene while the means for providing controllable illumination is at a second power level that is higher than the first power level;
means for calculating luminance measurements for a plurality of regions in the first image and a plurality of collocated regions in the second image;
means for calculating luminance differences between the plurality of regions in the first image and the plurality of collocated regions in the second image,
means for determining a difference threshold based on a maximum of the luminance differences; and
means for determining that a region of interest includes a plurality of regions for which a difference in the luminance measurements in the first and second images is above the difference threshold.

25. The apparatus of claim 24, wherein the means for calculating luminance differences is configured to calculate luminance differences between the plurality of regions in the first image and the plurality of collocated regions in the second image by calculating ratios of the luminance measurements of the plurality of regions in the first image and the luminance measurements of the plurality of collated regions in the second image.

26. The apparatus of claim 25, wherein the means for calculating luminance differences for each of the plurality of regions comprises:
means for calculating a sum of pixel luminance values for the region of the first image;
means for calculating a sum of pixel luminance values for the collocated region of the second image; and
means for calculating a difference between the sum of the pixel luminance values of the region of the first image and the sums of the luminance values of the collocated region of the second image.

27. The apparatus of claim 25, wherein the means for calculating luminance differences for each of the plurality of regions comprises:
means for calculating an average of pixel luminance values for the region of the first image;
means for calculating an average of pixel luminance values for the collocated region of the second image; and
means for calculating a difference between the average of the pixel luminance values of the region of the first image and the average of the luminance values of the collocated region of the second image.

28. The apparatus of claim 24, further comprising:
means for automatically configuring settings of the image capture device, based on the region of interest; and
means for capturing a third image of the scene using the automatically configured settings.

29. The apparatus of claim 28, wherein the means for automatically configuring settings comprises means for performing at least one of auto-exposure, auto-white balance, and auto-focus based on the region of interest.

30. The apparatus of claim 28, further comprising means for receiving a command to capture an image, wherein the means for capturing the first image are configured to capture the first image in response to the command, wherein the means for capturing the second image are configured to capture the second image in response to the command, and wherein the means for capturing the third image are configured to capture the third image in response to the command.

31. The apparatus of claim 24, wherein the means for calculating luminance differences is configured to calculate luminance differences between the plurality of regions in the first image and the plurality of collocated regions in the second image by calculating logarithms of the luminance measurements of the plurality of regions in the first image and the luminance measurements of the plurality of collated regions in the second image.

32. The apparatus of claim 24, wherein the means for calculating luminance differences is configured to calculate luminance differences between the plurality of regions in the first image and the plurality of collocated regions in the second image by adding the logarithms of the luminance measurements of the plurality of regions in the first image and the corresponding logarithms of the luminance measurements of the plurality of collated regions in the second image.

33. The apparatus of claim 24, wherein the first power level comprises zero power and wherein the second power level comprises full power.

34. A computer-readable storage medium encoded with instructions for causing a programmable processor of an image capture device to:
cause an image sensor of the image capture device to capture a first image of a scene while a controlled light source is at a first power level;
cause the image sensor of the image capture device to capture a second image of the scene while the controlled light source is at a second power level that is higher than the first power level;
calculate luminance measurements for a plurality of regions in the first image and a plurality of collocated regions in the second image;
calculate luminance differences between the plurality of regions in the first image and the plurality of collocated regions in the second image;
determine a difference threshold based on a maximum of the luminance differences; and
determine that a region of interest includes a plurality of regions for which a difference in the luminance measurements in the first and second images is above the difference threshold.

35. The computer-readable storage medium of claim 34, wherein calculating luminance differences further comprises:
calculating ratios of the luminance measurements of the plurality of regions in the first image and the luminance measurements of the plurality of collated regions in the second image.

36. The computer-readable storage medium of claim 35, wherein the instructions to calculate luminance differences for each of the plurality of regions comprises instructions to:
calculate a sum of pixel luminance values for the region of the first image;
calculate a sum of pixel luminance values for the collocated region of the second image; and
calculate a difference between the sum of the pixel luminance values of the region of the first image and the sums of the luminance values of the collocated region of the second image.

37. The computer-readable storage medium of claim 35, wherein the instructions to calculate luminance differences for each of the plurality of regions comprise instructions to:
calculate an average of pixel luminance values for the region of the first image;
calculate an average of pixel luminance values for the collocated region of the second image; and
calculate a difference between the average of the pixel luminance values of the region of the first image and the average of the luminance values of the collocated region of the second image.

38. The computer-readable storage medium of claim 34, further comprising instructions to:
automatically configure settings of the image capture device, based on the region of interest; and
cause the image sensor of the image capture device to capture a third image of the scene using the automatically configured settings.

39. The computer-readable storage medium of claim 38, wherein the instructions to automatically configure the settings comprises instructions to perform at least one of auto-exposure, auto-white balance, and auto-exposure based on the region of interest.

40. The computer-readable storage medium of claim 38, further comprising instructions to receive a command to capture an image, wherein the instructions to cause the image sensor to capture the first image comprise instructions to cause the image sensor to capture the first image in response to the command, wherein the instructions to cause the image sensor to capture the second image comprise instructions to cause the image sensor to capture the second image in response to the command, and wherein the instructions to cause the image sensor to capture the third image comprise instructions to cause the image sensor to capture the third image in response to the command.

41. The computer-readable storage medium of claim 34, wherein the instructions to cause the image sensor to capture the second image comprise instructions to cause the image sensor to capture the second image within 400 milliseconds of capturing the first image.

42. The computer-readable storage medium of claim 34, wherein calculating luminance differences further comprises calculating logarithms of the luminance measurements of the plurality of regions in the first image and the luminance measurements of the plurality of collated regions in the second image.

43. The computer-readable storage medium of claim 34, wherein adding the logarithms of the luminance measurements of the plurality of regions in the first image and the corresponding logarithms of the luminance measurements of the plurality of collated regions in the second image.

* * * * *